Patented Nov. 17, 1925.

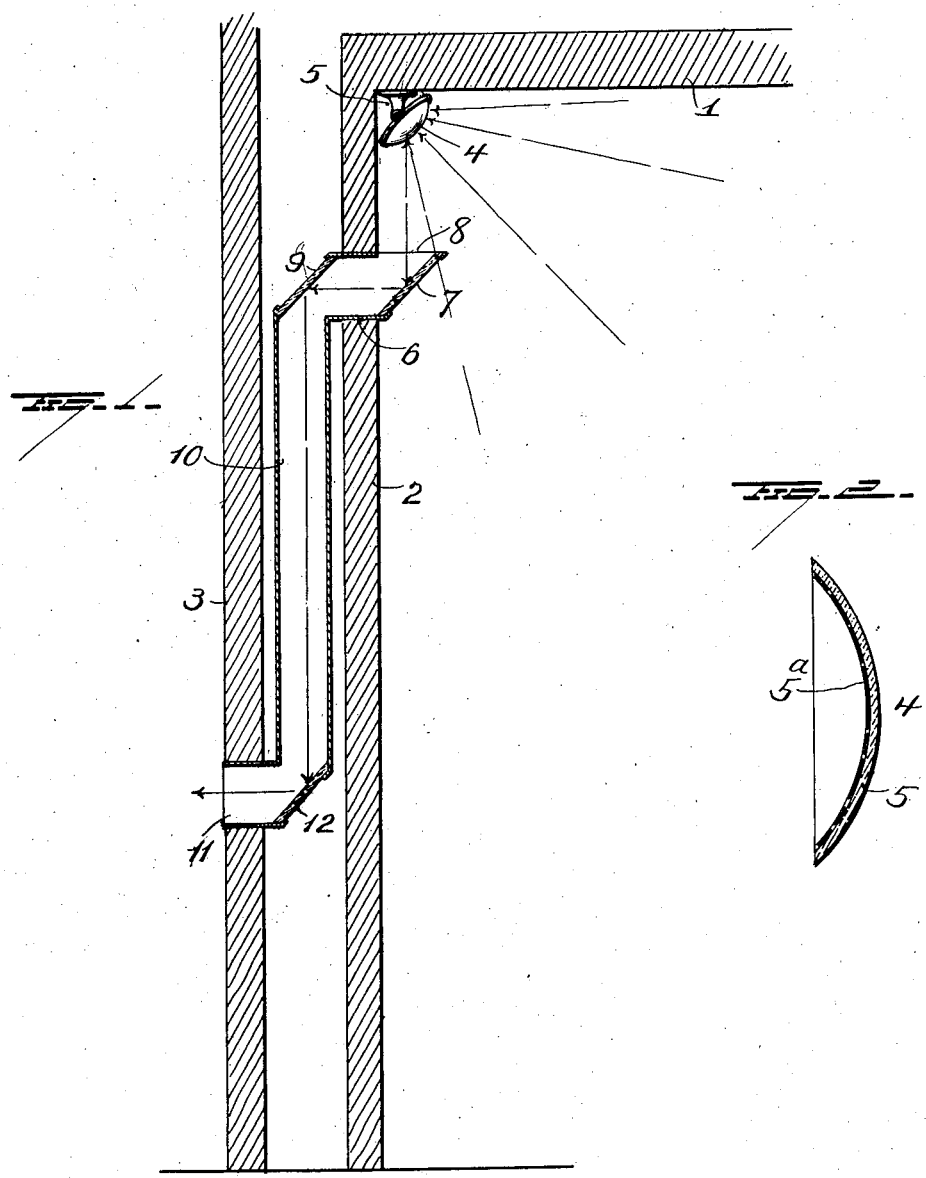

1,561,920

UNITED STATES PATENT OFFICE.

FRED FULGORA, OF PITTSBURGH, PENNSYLVANIA, ASSIGNOR OF FORTY-FIVE PER CENT TO JAMES N. McGRATH, JR., AND TEN PER CENT TO A. H. LESLIE, BOTH OF PITTSBURGH, PENNSYLVANIA.

OPTICAL DEVICE.

Application filed September 2, 1921. Serial No. 498,121.

*To all whom it may concern:*

Be it known that I, FRED FULGORA, a citizen of the United States, and a resident of Pittsburgh, in the county of Allegheny and State of Pennsylvania, have invented certain new and useful Improvements in Optical Devices; and I do hereby declare the following to be a full, clear, and exact description of the invention, such as will enable others skilled in the art to which it appertains to make and use the same.

This invention relates to improvements in optical devices and more particularly to means for permitting the observation of the interior of a room from the exterior thereof,—the object of the invention being to so construct optical devices of the character stated that the entire interior of a room and objects in every portion thereof may be observed or viewed by a person outside the room.

With this object in view the invention consists in certain novel features of construction and combinations of parts as hereinafter set forth and pointed out in the claim.

In the accompanying drawings, Figure 1 is a fragmentary sectional view illustrating a room and the application of my improvements, and Figure 2 is an enlarged sectional view of the mirror which is employed within the room.

The ceiling of the room is represented at 1 and a side wall at 2,—and spaced from the latter, an outer wall or partition 3 is illustrated.

Located at an upper corner of the room is a mirror 4 which is adjustably supported by a bracket 5 suitably secured to the ceiling or wall of the room. The mirror 4 may be circular and is convex so as to present a convex outer face 5 and the silvering 5ª of said mirror is applied to its concave inner face. A mirror of this shape is capable of reflecting every portion of the room and all the objects therein and in order that such reflections may be observed by a person outside of the room, the devices now to be described are employed.

A tube 6 is passed through a suitable opening in the wall 2 below the mirror 4 and is provided at one end with a flat mirror 7 disposed at an angle of approximately 45° so that images may be reflected onto the same by the mirror 4 and through an opening 8 in said tube. A mirror 9 is located at the other end of the tube 6 and is disposed at an angle of 45°. The upper end of a tube 10 communicates with an opening in the tube 6 under the mirror 9 and extends downwardly outside of the wall 2 or between the walls 2 and 3 and at its lower end said tube 10 communicates with a horizontal tube 11 passing through the wall 3 at a convenient height above the floor line. At the juncture of the tubes 10 and 11, a mirror 12 is located and disposed at an angle of 45° so as to receive the reflection of images from the mirror 9 and reflect the same to the eye of the observer at the free end of the tube 11. The tubes 6, 10 and 11 may be made of any suitable material but their inner surfaces should be of a non-reflecting character.

Having fully described my invention what I claim as new and desire to secure by Letters-Patent, is:

Means for observing the interior of an enclosure from a point outside the enclosure, comprising a convex mirror secured across a corner defined by the top and a side of the enclosure at an angle of approximately 45° to the side and top of the enclosure, a tube passing horizontally through the side of the enclosure below the convex mirror with one end projecting into the enclosure and having an opening in its upper side vertically under the convex mirror, and a plane mirror extending across the inner end of the tube below the opening in the upper side thereof at an angle of approximately 45° to the side of the enclosure, the lower end of said plane mirror being located at the side of the enclosure and the upper end of the mirror being spaced inwardlly from the same and there being a free unobstructed open space between the plane mirror and the convex mirror whereby the entire interior of the enclosure is within the range of the convex mirror.

In testimony whereof, I have signed this specification.

FRED FULGORA.